United States Patent Office 2,776,900
Patented Jan. 8, 1957

2,776,900

GLASS COMPOSITION

James E. Duncan, Brackenridge, and Samuel L. Seymour, New Kensington, Pa., assignors to Pittsburgh Plate Glass Company No Drawing. Application December 16, 1953,
Serial No. 398,639

6 Claims. (Cl. 106—52)

The present invention relates to a family of glass compositions suitable to provide a series of opaque glasses having permanent pastel colors ranging from yellow to tan. These glass compositions provide a set of colors that are pleasing to the eye and enhance the beauty of a structure whose walls are covered with a glass of this type.

Patent No. 2,237,042 to Harry A. Truby describes an opaque glass having a permanent red color produced by including fluorine to produce opalescence and small amounts of a mixture of a gold halide and selenium to produce the coloring in the glass composition. Surprisingly, it has been discovered that the addition of a small amount of silver in a glass composition containing fluorine, gold and selenium improves the uniformity of the striking of the colorants and provides an opaque glass composition having a permanent, pastel color that may be varied from yellow to tan depending on the relative proportions of the coloring ingredients, gold and silver, included in the composition.

It is well known from the aforementioned Truby patent that the addition of gold provides glass with a characteristic reddish tint, that the inclusion of fluorine opacifies the glass and that the addition of selenium provides nuclei for striking the desired red color. It is also well known that silver provides glass compositions with a characteristic yellow to brownish color.

The addition of silver plus selenium to a fluorine containing glass free from gold forms a brownish opaque composition characterized by a non-uniform color dispersion. The addition of a slight amount of gold to the batch forming this composition results in increased homogeneity of the color throughout the mixture and a pleasing color. It is believed that the presence of the gold improves the striking of the silver.

Opaque glass compositions containing both gold and silver, and having pastel colors that vary from yellow to tan are provided by the present invention. The exact color obtained is determined by the balance between the amounts of gold and silver in the composition. It is essential that both gold and silver be included in the glass compositions constituting the present invention. In this manner, not only is the deleterious effect of large amounts of fluorine on the durability of certain pastel shaded glass compositions inhibited, but also the use of gold, a very expensive ingredient, is kept to a minimum.

It is an object of the present invention to provide a family of novel, opaque glass compositions tinted in various pastel shades.

Another object of the present invention is to provide a family of opaque glass compositions containing a mixture of fluorine, gold, silver and selenium.

Still another object of the present invention is to provide glass compositions of the class described utilizing a minimum of expensive ingredients in their fabrication.

These and other objects of the present invention will become apparent upon further study of the accompanying description.

It is very difficult to obtain a yellow or tan tint of high color purity in glass. Uranium is one source of a suitable yellow color. However, the importance of this material in other fields has resulted in restrictions on its use for glass making. The present invention provides a combination of easily obtainable coloring materials which produces the desired colors without requiring the use of uranium.

Typical glass compositions which can be provided with the proper permanent coloring contain:

| | Percent by weight |
|---|---|
| $SiO_2$ | 55 to 75 |
| $Na_2O$ | 0 to 15 |
| $K_2O$ | 0 to 15 |
| Total alkali metal oxides | 11 to 21 |
| $Al_2O_3$ | 2 to 12 |
| One or more bivalent metal oxides from the group consisting of CaO, MgO, BaO, and ZnO | 0 to 12 |
| $Sb_2O_5$ | 0 to 2 |
| $As_2O_5$ | 0 to 2 |
| Gold | .0005 to .0024 |
| Silver | .0004 to .0050 |
| Selenium | .0002 to .002 |
| Fluorine | 1 to 6 |

Silica is the principal glass former. We prefer a range of $SiO_2$ of between 55 and 75% by weight of the glass composition. The durability of glass containing less than 55% $SiO_2$ is poor and it is difficult to melt a glass composition including over 75% $SiO_2$. There is also a tendency for glass containing more than the desired maximum of $SiO_2$ to devitrify.

The alkali metal oxides $Na_2O$, and $K_2O$ are the principal fluxes. $Li_2O$ may also be used to replace part or all of the $Na_2O$ and $K_2O$. However, this material increases the cost of the batch and we prefer to have between 11 and 21% of a combination of $Na_2O$ and $K_2O$. Glass having below 11% of $Na_2O$ or $K_2O$ is difficult to melt. Glass has poor durability when the total alkali metal oxide content exceeds 21% by weight.

The $Al_2O_3$ increases the working range of the glass. If more than 12% $Al_2O_3$ is included in the glass, an excessive amount of alkali and fluorine is required to compensate for the excess stiffness imparted to the glass by the alumina. Including less than 2% $Al_2O_3$ by weight imparts an undesirable working range to the glass.

Fluorine is used as an opacifying agent. It is also considered as a flux and a colorant. The amount of white or opacity has a very great effect on the intensity of the yellow color from the silver. We prefer to have between 2.5% and 3.0% $F_2$ in our glass although as high as 6% or as low as 1% may be used depending on the percentages of the other constituents, the degree of annealing and the intensity of the color required.

Up to 10% CaO may be employed. The presence of CaO requires a higher percentage of fluorine for the equivalent capacity. CaO tends to produce a more uniform opacity with smaller fluoride crystals. For glasses wherein a low alkali content is desired and a high percentage of fluorine is used as a flux, a high percentage of CaO is employed to control the amount of opacity. Glass containing above 10% CaO requires an extremely high percentage of fluorine, which results in a glass having unsatisfactory durability. To obtain the maximum opacity with the minimum fluorine, the glass should be free from CaO. However, we prefer a glass which contains approximately .5% CaO in order to obtain a proper balance of the other constituents. Other bivalent metal oxides such as MgO, ZnO and BaO may also be substituted for part or all of the CaO but we have found that the increased cost of these other materials does not justify their use. When such substituted bivalent metal oxides are used, the maximum total weight of the bivalent metal oxides may be increased to about 12%.

Arsenic and antimony are used as refining agents to aid in removing undissolved gases in the molten glass. More than 2% of either refining agent does not appear to be beneficial to the finished glass composition.

The amount of fluorine present in the glass composition must be delicately balanced with the amount of gold, silver and selenium present. If too much fluorine is included, the glass will opacify too rapidly, thereby forming an opaque glass having a lighter color than that desired. On the other hand, too little fluorine compared to the other colorants results in a colored glass having a milky, translucent appearance instead of the desired opacity.

The balance between the fluorine and the coloring agents is necessitated by the manner in which the glass is formed. Raw batch materials are thoroughly mixed before being fused together to form molten glass. After melting, the glass is refined to remove occluded gases. The refined glass formed into a continuous sheet is withdrawn from the furnace and introduced into an annealing lehr where it is annealed. During this annealing operation, the glass is cooled. During this cooling, the fluoride particles are formed and the color develops as a result of a use of a combination of the proper proportions of fluorine, gold and silver.

The desired pastel colors produced result from the mixture of the colors imparted to the glass by the gold and silver and the white color produced upon crystallization of the fluorine containing compounds. Therefore, it is necessary to have sufficient colorants to provide a uniform coloring and sufficient fluorine to provide uniform opalescence, throughout the volume of the composition. The temperature at which the fluorine compounds crystallize as the molten glass cools is preferably controlled so that the color produced by the striking of the gold and silver occur during the crystallization of the fluorides.

The reaction that takes place is not limited to the surface of the glass as is the case of silver containing glasses disclosed in Patents Nos. 2,515,939 and 2,515,940 to William H. Armistead and Patents Nos. 2,515,275, 2,651,145 and 2,651,146 to Stanley D. Stookey. The present family of glass compositions contain their desired color when they are annealed in the annealing lehr. There is no necessity for exposing the present glass compositions to high energy radiations nor to reheat the glass to produce the desired color.

The glass compositions comprising the present invention are opaque and have pleasing pastel colors. The pastel shades that are formed when the glass is annealed are not appreciably changed during their subsequent use.

Tables I and II recite various batch compositions and glasses formed therefrom, respectively. The glass compositions recited in Table II are calculated from the respective batches listed in Table I, assuming a 20% loss of fluorine during formation of the respective glasses.

*Table II*

| Ingredient | Batch | | | | | |
|---|---|---|---|---|---|---|
| | No. 1 | No. 2 | No. 3 | No. 4 | No. 5 | No. 6 |
| $SiO_2$ Percent | 69.9 | 69.9 | 67.5 | 67.5 | 63.0 | 63.0 |
| $Na_2O$ do | 9.4 | 9.4 | 11.2 | 11.2 | 7.5 | 7.5 |
| $K_2O$ do | 8.0 | 8.0 | 3.0 | 3.0 | 7.5 | 7.5 |
| CaO do | .5 | .5 | 8.0 | 8.0 | 5.3 | 5.3 |
| $Al_2O_3$ do | 8.5 | 8.5 | 3.8 | 3.8 | 6.4 | 6.4 |
| $F_2$ do | 2.7 | 2.7 | 5.5 | 5.5 | 3.7 | 3.7 |
| $As_2O_5$ do | 1.0 | 1.0 | 1.0 | 1.0 | 1.0 | 1.0 |
| ZnO do | | | | | 5.6 | 5.6 |
| Gold do | .0008 | .0013 | .0013 | .0006 | .0008 | .0024 |
| Silver do | .0005 | .0011 | .0011 | .0011 | .0013 | .0038 |
| Selenium do | .0002 | .0002 | .0002 | .0002 | .0002 | .0002 |
| Color | light tan | yellow | dark tan | pinkish tan | light yellow | dark yellow |

It is understood that various modifications of ingredients within the ranges cited may be made without departing from the spirit of the present invention. However, in using bivalent metal oxide substitutes for CaO, PbO should be avoided because it reacts with selenium to produce a dark tint inimical to the pastel shades desired.

It is understood that modifications in the amounts of various batch ingredients are required to form different glass compositions within the desired range. It is also understood that obvious substitutions may be made in the various ingredients used in the batch, but that those ingredients listed in Table I as batch materials are the least expensive of those presently available. The sources of gold and silver, for example, may be any gold or silver salt available.

What is claimed is:

1. A glass composition having an opaque, pastel color ranging from tan to yellow consisting essentially of $SiO_2$ 55 to 75% by weight; $Na_2O$, 0 to 15% by weight; $K_2O$, 0 to 15% by weight, the sum total of alkali metal oxide ranging from about 11 to 21%; $Al_2O_3$, 2 to 12% by weight; 0 to 10% by weight CaO, 0 to 12% by weight MgO, 0 to 12% by weight BaO, and 0 to 12% by weight ZnO, the total of bivalent metal oxides when present being not more than 12% by weight; $Sb_2O_5$, 0 to 2% by weight; $As_2O_5$, 0 to 2% by weight; Au, .0005 to .0024% by weight; Ag, .0004 to .005% by weight; Se, .0002 to .002% by weight and fluorine 1 to 6% by weight.

2. A light tan glass composition such as recited in claim 1 wherein the amount of Au by weight is about .0008% and the amount of Ag is about .0005%.

3. A yellow glass composition such as recited in claim 1 wherein the amount of Au by weight is about .0013% and the amount of Ag is about .0011%.

4. A glass composition such as recited in claim 1 wherein the bivalent metal oxide is not more than 10% by weight of the glass of CaO.

5. A glass composition such as recited in claim 1 wherein the fluorine content is between about 2.5% and 3.0% by weight of the glass.

6. A glass composition having an opaque, pastel color

*Table I*

| Ingredient | Batch | | | | | |
|---|---|---|---|---|---|---|
| | No. 1 | No. 2 | No. 3 | No. 4 | No. 5 | No. 6 |
| Sand | 495 lb | 495 lb | 735 lb | 735 lb | 528 lb | 528 lb |
| Soda Ash | 154 lb | 154 lb | 207 lb | 207 lb | 140 lb | 140 lb |
| Feldspar | 693 lb | 693 lb | 311 lb | 311 lb | 476 lb | 476 lb |
| Sodium Nitrate | | | 50 lb | 50 lb | | |
| Potassium Carbonate | | | 16 lb | 16 lb | | |
| Potassium Nitrate | 90 lb | 90 lb | | | 80 lb | 80 lb |
| Calcium Fluoride | 10 lb | 10 lb | 164 lb | 164 lb | 109 lb | 109 lb |
| Sodium Silica Fluoride | 70 lb | 70 lb | 34 lb | 34 lb | 25 lb | 25 lb |
| Arsenic | 15 lb | 15 lb | 14 lb | 14 lb | 14 lb | 14 lb |
| Zinc Oxide | | | | | 80 lb | 80 lb |
| Gold Chloride (grams) | 8 gms | 13 gms | 13 gms | 6 gms | 8 gms | 24 gms |
| Silver Nitrate (grams) | 6 gms | 12 gms | 12 gms | 12 gms | 14 gms | 39 gms |
| Selenium | 1.5 gms | 1.5 gms | 1.5 gms | 1.5 gms | 1.5 gms | 1.5 gms |
| Color | light tan | yellow | dark tan | pinkish tan | light yellow | dark yellow | ranging from tan to yellow consisting essentially of SiO₂, 55 to 75% by weight; Na₂O, 0 to 15% by weight; K₂O, 0 to 15% by weight, the sum total of alkali metal oxide ranging from about 11 to 21% by weight; Al₂O₃, 2 to 12% by weight; at least one bivalent metal oxide selected from the group consisting of 0 to 10% by weight CaO, 0 to 12% by weight MgO, 0 to 12% by weight BaO and 0 to 12% by weight ZnO, the total bivalent metal oxide content being not over 12% by weight; Sb₂O₅, 0 to 2% by weight; As₂O₅, 0 to 2% by weight; Au, 0.0005 to 0.0024% by weight; Ag, 0.0004 to 0.005% by weight; Se, 0.0002 to 0.002% by weight and fluorine 1 to 6% by weight.

References Cited in the file of this patent
UNITED STATES PATENTS

| | | |
|---|---|---|
| 2,515,275 | Stookey | July 18, 1950 |
| 2,515,936 | Armistead | July 18, 1950 |
| 2,651,145 | Stookey | Sept. 8, 1953 |